United States Patent [19]

Witkowski et al.

[11] Patent Number: 5,557,782

[45] Date of Patent: Sep. 17, 1996

[54] FLEXIBLE DETERMINISTIC STATE MACHINE

[75] Inventors: Todd R. Witkowski, Bainbridge Township; Vincent J. Messina, Pittsfield Township, both of Mich.; Richard D. Ball, Austin, Tex.; John T. Filion, Lawrenceville, Ga.

[73] Assignee: Zenith Data Systems Corporation, Buffalo Grove, Ill.

[21] Appl. No.: 273,763

[22] Filed: Jul. 12, 1994

[51] Int. Cl.[6] .................................................. G06F 12/00
[52] U.S. Cl. ............................................ 395/550; 395/494
[58] Field of Search ...................................... 395/550, 494

[56] References Cited

PUBLICATIONS

Intel Corporation, "Programmable State Tracker Logic Overview", Intel486 SX/Intel 487 SX CPU Module Manual, Rev. 2.0, May, 1991; pp. 2 and 7.

Intel Corporation, "82350DT EISA Chipset System Architecture Overview", Chipset Focus Group, May, 1991, Rev. 2.0, Title pages, Table of Contents and pp. 1–47.

Primary Examiner—Thomas M. Heckler
Attorney, Agent, or Firm—T. Murray Smith; Scott B. Dunbar; James A. Sprowl

[57] ABSTRACT

A computer system has a memory and has a processor coupled to the memory, the processor having an access control arrangement for delaying completion of a memory access until the occurrence of a control signal. A deterministic circuit coupled to the-processor and the memory has a register arrangement containing control information loaded by the processor, the deterministic circuit having a signal generation arrangement for generating the control signal. The signal generating arrangement includes a selective delay arrangement which can selectively delay generation of the control signal during an access to the memory by a time interval having a duration which is a function of the control information in the register arrangement.

12 Claims, 8 Drawing Sheets

Fig. 6

```
CSTART  = !CLOCK33 & !HAS &  ADS & !SNPHOLD & (!SHMREQ # !HMACK) & !PSTRST
        # !CLOCK33 & !HAS & LADS & !SNPHOLD & (!SHMREQ # !HMACK) & !PSTRST
        # !CLOCK33 &  HAS                   & !SHMREQ &  HMACK   & !PSTRST
        # !CLOCK33 &   CSTART & !PSTRDY                          & !PSTRST
        #  CLOCK33 &  PCSTART & !PSTRDY                          & !PSTRST

HAS     = !HAS & (ADS # LADS) & !SNPHOLD & !PSTRST
        #  HAS & !PSTRDY                 & !PSTRST

LADS    = !LADS & ADS & (HAS # SNPHOLD) & !PSTRST
        #  LADS       & (HAS # SNPHOLD) & !PSTRST

HMACK   = !HMACK & SHMREQ & !LOCK & !HAS & !ADS & !LADS & !PSTRST
        # !HMACK & SHMREQ & !LOCK & !HAS & SNPHOLD      & !PSTRST
        # !HMACK & SHMREQ & !LOCK &  HAS & PSTRDY       & !PSTRST
        #  HMACK & SHMREQ                               $ !PSTRST

PCSTART = CLOCK33 & !HAS & (ADS # LADS) & !SNPHOLD & !HMACK) & !PSTRST
        # CLOCK33 &  HAS & !SHMREQ & HMACK & !PSTRDY         & !PSTRST
        # CLOCK33 & PCSTART                & !PSTRDY         & !PSTRST

PSTRDY  = DBRDY & !HBURST
        # DBRDY &  HBURST & BLAST
        # ARDY

SHMREQ  = HMREQ & !PSTRST
```

Fig. 7

```
SNP0       = !PSTRST & !SNP0 & SNP1 & SNP3
           # !PSTRST & SNP0 & !SNP1 & !SNP2 & SNP3
SNP1       = PSTRST
           #  SNP0
           # !SNP1
           #  SNP2
           # !SNP3
SNP2       = PSTRST
           # !SNP1
           # !SNP3
           # !SNP0 &  SNP2
           #  SNP0 & !SNP2
           #  SNP0 & !SSNPRQ
SNP3       = !PSTRST & !SNP0 &  SNP1 & SNP3
           # !PSTRST &  SNP0 & !SNP1 & !SNP2 & SNP3
           # !PSTRST & !SNP0 &  SNP1 &  SNP2 & SSNPRQ
           # !PSTRST &  SNP1 &  SNP2 &  SNP3 & SSNPRQ
SNPHOLD    = !PSTRST & SNP3
           # !PSTRST & SSNPRQ
SSNPRQ     = ! HS & !PSTRST & SNUPRQ
```

Fig. 8

|         | D4W1B1 | D4W1B0 | D3W1B1 | D3W1B0 | D2W1B1 | D2W1B0 |
|---------|--------|--------|--------|--------|--------|--------|
| RESET   | 1      | 1      | 1      | 1      | 1      | 1      |
| 33MHz   | 1      | 0      | 1      | 0      | 1      | 0      |
| 25mHz   | 0      | 1      | 0      | 1      | 1      | 0      |

Fig. 9

|         | D4W2B1 | D4W2B0 | D3W2B1 | D3W2B0 | D2W2B1 | D2W2B0 |
|---------|--------|--------|--------|--------|--------|--------|
| RESET   | 1      | 1      | 1      | 1      | 1      | 1      |
| 33MHz   | 0      | 0      | 0      | 1      | 0      | 0      |
| 25mHz   | 0      | 0      | 0      | 1      | 0      | 0      |

Fig. 10

|         | D4W4B1 | D4W4B0 | D3W4B1 | D3W4B0 | D2W4B1 | D2W4B0 |
|---------|--------|--------|--------|--------|--------|--------|
| RESET   | 1      | 1      | 1      | 1      | 1      | 1      |
| 33MHz   | 0      | 0      | 0      | 0      | 0      | 0      |
| 25mHz   | 0      | 0      | 0      | 0      | 0      | 0      |

FLEXIBLE DETERMINISTIC STATE MACHINE

FIELD OF THE INVENTION

The present invention relates generally to a deterministic circuit for generating a ready signal to a processor to indicate the end of a memory access and, more particularly, to such a deterministic circuit which is programmable to operate with different processor types and speeds.

BACKGROUND OF THE INVENTION

Conventional computer systems include a memory and a processor coupled to the memory, the processor including an access control arrangement which effects accesses to the memory. With respect to each access, the access control arrangement will, if necessary, delay completion of the access in the absence of and until the occurrence of a ready signal, in particular by entering successive wait states until the ready signal is received. In the case of an access to a device for which the duration of the access cannot be predicted in advance, a non-deterministic circuit is provided to handle the generation of the ready signal. With respect to an access to a device for which the necessary delay can be predicted in advance, a deterministic circuit is provided to handle the generation of the ready signal. The known deterministic circuit also has the capability to handle a processor which can carry out a burst-type access, which involves a plurality of memory accesses in rapid succession. While this known arrangement has been generally adequate for its intended purposes, it has not been satisfactory in all respects.

More specifically, there has been an increasing trend to provide computer systems in which the processor can be upgraded in terms of type and/or speed, so that the system performance can be upgraded by a user at a future time. Although a faster processor could possibly be used with a deterministic circuit designed for use with a slower processor, it would slow down the operation of the faster processor and thus vitiate much of the speed advantage desired from the processor upgrade. To date, therefore, a unique deterministic circuit has been used for each processor type and/or speed, and thus the deterministic circuit had to be changed whenever the processor was changed in order to realize optimum performance. As a result, it has become conventional to provide a special processor circuit board which plugs into a connector on the motherboard of the computer system and which carries the processor and the deterministic circuit, and possibly support circuitry such as a clock generation circuit producing clock signals at a speed corresponding to the speed of the processor. Of course, it is inconvenient, inefficient and expensive to replace an entire processor board simply to upgrade the processor.

It is therefore an object of the present invention to provide a single deterministic circuit which is sufficiently generic or flexible to work with a wide variety of processor types and speeds, so that it is not necessary to provide a separate processor board. The deterministic circuit and a socket for the processor would be provided directly on the motherboard, whereby the processor could be replaced basically by removing it from the socket and inserting a different processor in the socket, possibly with a change to a jumper or switch, and the deterministic circuit would simply be programmed during system initialization to be compatible with the particular type and speed of processor currently present in the socket.

SUMMARY OF THE INVENTION

The objects and purposes of the invention, including those set forth above, are met according to one from of the present invention by providing a computer system which includes: a memory; a processor coupled to the memory, the processor including an access control arrangement for effecting an access to the memory and for delaying completion of the access to the memory in the absence of and until an occurrence of a control signal; and a deterministic circuit coupled to the processor and the memory and having a register arrangement containing control information loaded by the processor, the deterministic circuit having a signal generation arrangement for generating the control signal, the signal generation arrangement including a delay arrangement for selectively delaying generation of the control signal during an access to the memory by a time interval having a duration which is function of the control information in the register arrangement.

BRIEF DESCRIPTION OF THE DRAWINGS

A preferred embodiment of the present invention is described in detail hereinafter with reference to the accompanying drawings, in which:

FIG. 6 and 7 set forth logic equations which represent the logic circuitry in a signal generation circuit which is a component of the system of FIG. 1; and FIGS. 8 through 10 are tables showing values which, in the preferred embodiment, can be loaded into registers in the deterministic state machine circuit of FIG. 2.

DETAILED DESCRIPTION

Figure 1:
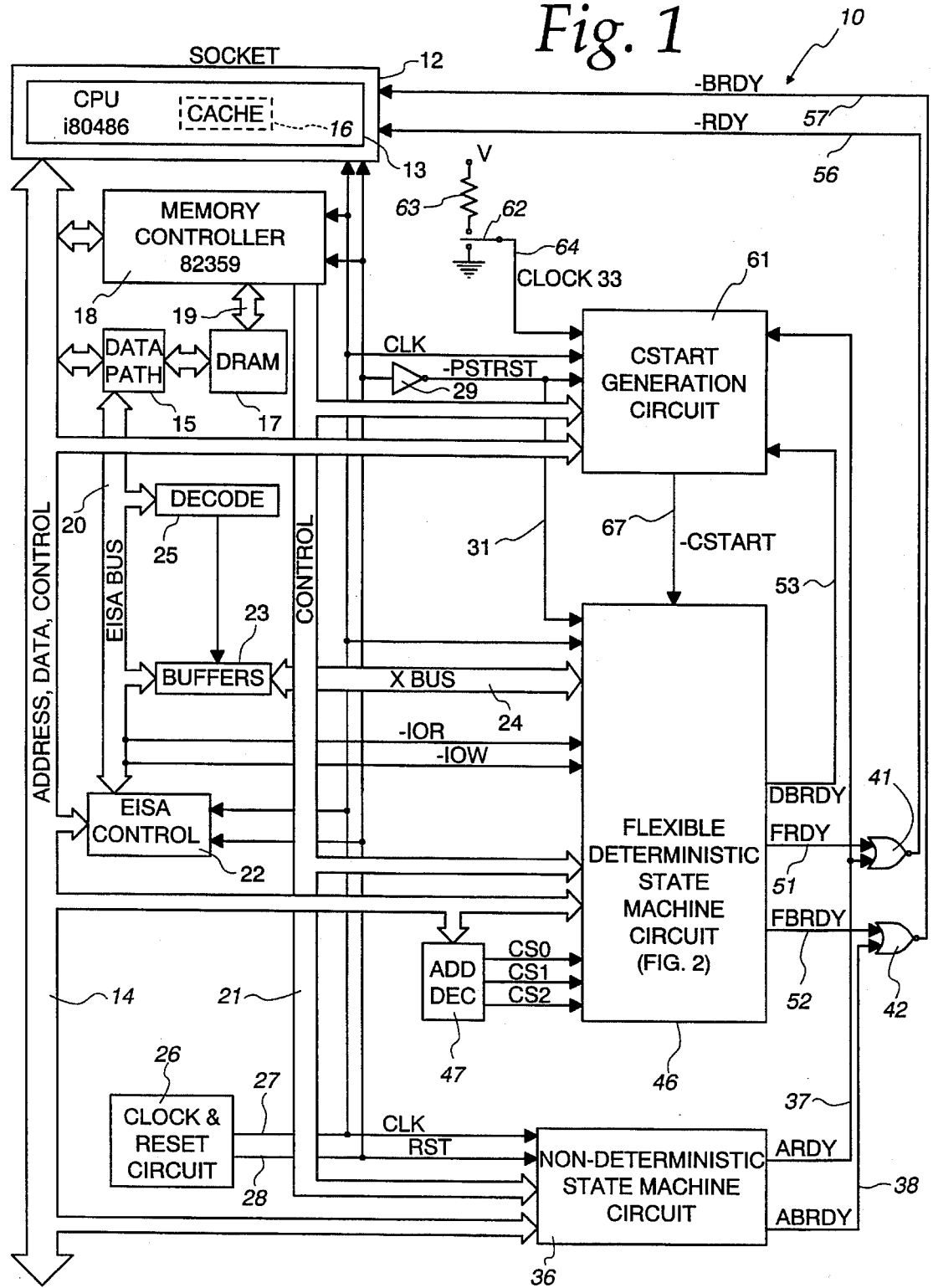
FIG. 1 is a block diagram of a computer system embodying the present invention, but depicts only those components of the system which are necessary to an understanding of the present invention.

Referring to FIG. 1, reference numeral 10 designates a computer system which embodies the present invention. The computer system 10 is shown diagrammatically, and FIG. 1 shows only those components of the system which are pertinent to an understanding of the present invention. In the following description of the system 10, the symbols "-" and "!" are used at the beginning of the names of logic signals which are active low, and the symbols "&" and "#" respectively designate logical AND and logical OR functions.

More specifically, the computer system 10 includes a conventional socket 12 into which a conventional central processing unit (CPU) chip 13 is removably plugged. In the preferred embodiment, the processor or CPU 13 is an i80486 or "486" manufactured by Intel Corporation of Santa Clara, Calif. The CPU 13 is itself conventional, and therefore not described in detail here. The i80486 CPU is commercially available in several versions which have different maximum speeds, including 16 MHz, 20 MHz, 25 MHz and 33 MHZ. It will be recognized that other types of processors, such as the Pentium manufactured by Intel Corporation, could be substituted for the CPU chip 13.

The CPU 13 includes a conventional internal cache memory 16. A bus 14 carries address, data and control information, and is coupled to the CPU 13. The CPU 13 can output address, data and control information onto the bus 14.

Reference numeral 17 designates a conventional dynamic random access memory (DRAM), which is coupled through a data path circuit 15 to the bus 14. The data path circuit 15 is implemented with conventional Intel 82353 data path chips. Reference numeral 18 designates a conventional memory controller chip, which in the preferred embodiment is an 82359 available commercially from Intel Corporation. The memory controller chip 18 is coupled to the bus 14, and is coupled at 19 to the DRAM memory 17. The memory controller 18 also outputs several control signals at 21.

A clock and reset circuit 26 of a conventional design outputs a system clock signal CLK on a line 27, and outputs a system reset signal RST on a line 28. The CLK and RST signals on lines 27 and 28 are coupled to the CPU 13 and the memory controller 18. The reset signal RST on line 28 is inverted by an inverter 29, in order to produce a buffered reset signal -PSTRST on a line 31.

An extended industry standard architecture (EISA) bus 20 couples the data path circuit 15 to an EISA control circuit 22, bidirectional buffers 23, and a decode circuit 25. The EISA control circuit 22 is a conventional Intel 82358 chip which controls the EISA bus 20 in a conventional manner, including generation of an input/output read signal -IOR and an input/output write signal -IOW, and also controls the data path circuits 15. The decode circuit 25 is of a conventional type, and controls the buffers 23 in a conventional manner based on the address and control signals on the bus 20. For purposes of the present invention it is sufficient to understand that data output by CPU 13 on bus 14 can travel through the data path circuits 15, across EISA bus 20, and through buffers 23 to the data lines of X bus 24.

Reference numeral 36 designates a non-deterministic state machine circuit, which is coupled to the bus 14, and receives the control signals 21, the clock signal CLK from line 27, and the reset signal RST from line 28. The non-deterministic state machine circuit 36 is conventional and not itself a part of the present invention. Therefore, the circuit 36 is not disclosed in detail, although its function will be briefly summarized later in order to facilitate an understanding of the present invention. The non-deterministic state machine circuit 36 produces an output signal ARDY on a line 37 and an output signal ABRDY on a line 38, which are respectively coupled to inputs of a pair of two-input NOR gates 41 and 42.

A flexible deterministic state machine circuit is identified with reference numeral 46, and embodies an important part of the present invention. The flexible deterministic state machine circuit 46 is coupled to the bus 14, and receives the control signals 21, the clock signal CLK from line 27, and the buffered reset signal -PSTRST from line 31. An address decoding circuit 47 of a conventional type is coupled to the address lines of bus 14, and outputs three chip select signals CS0, CS1 and CS2 which are coupled to respective inputs of the state machine circuit 46. The state machine circuit 46 produces an output signal FRDY on line 51 which is coupled to an input of NOR gate 41, an output signal FBRDY on line 52 which is coupled to an input of NOR gate 42, and an output signal DBRDY on line 53. Gate 41 produces an output signal -RDY on line 56 which is coupled to the CPU 13, and gate 42 produces an output signal -BRDY on line 57 which is coupled to the CPU 13.

A CSTART generation circuit 61 is coupled to the bus 14, and receives the control signals 21, the clock signal CLK on line 27, the buffered reset signal -PSTRST on line 31, the ARDY signal on line 37, and the DBRDY signal on line 53. The CSTART generation circuit produces an output -CSTART on line 67 which is coupled to the flexible deterministic state machine circuit 46. A switch or jumper 62 can be manually set so as to be connected to ground or, through a pull-up resistor 63, to a DC voltage level, in order to create a DC logic signal CLOCK33 on line 64 which is coupled to an input of the CSTART generation circuit 61. The signal CLOCK33 on line 64 is not itself a clock signal, but instead indicates the speed of the clock signal CLK produced on line 27 by the clock and reset circuit 26. In particular, in the preferred embodiment, the signal CLOCK33 on line 64 has a logic high level in a system where the clock signal CLK has the speed of 33 MHz, and has a logic low level in a system where the clock signal CLK has a speed of 25 MHz.

Before describing the flexible deterministic state machine circuit 46 of FIG. 1 in greater detail, some background information will be helpful. As mentioned above, the 486 CPU 13 is commercially available in different versions with different maximum speeds for the clock signal CLK on line 27, for example maximum speeds of 16 MHz, 20 MHZ, 25 MHZ and 33 MHz. If the CPU 13 were the 25 MHz version, the switch or jumper 62 would be connected to ground so that the signal CLOCK33 on line 64 would be a logic low level, and the clock and reset circuit 26 would be producing a 25 MHz clock signal CLK on line 27. In order to upgrade the system to a 33 MHz CPU, the CPU 13 would be removed from socket 12 and replaced with the 33 MHz 486 CPU, the switch or jumper 62 would be manually switched so that pull-up resistor 63 produces a logic high level on line 64, and a jumper or switch would be adjusted in clock and reset circuit 26 so that the CLK signal produced on line 27 had a speed of 33 MHz.

Each version of the 486 CPU 13 is a relatively fast processor. Therefore, when the CPU 13 requests data from the memory 17 or a not-illustrated peripheral device, after the request the CPU 13 may have to wait for the memory or the peripheral device to supply the needed data. In particular, after requesting the data, the CPU 13 pauses until it receives a signal on the -RDY line 56 to indicate that the data is now present on bus 14 for the CPU 13 to accept and process. The 486 CPU 13 also has a special read burst mode, in which it can rapidly read up to four adjacent memory locations. During the burst transfer, a special ready signal -BRDY on line 57 is used to tell the CPU 13 when each of the successive words is present on bus 14 during the burst transfer.

With respect to DRAM memory 17, a 20-bit address is used to select a location in the DRAM memory 17. A single set of ten address lines is used to successively supply the ten most significant bits and the ten least significant bits of the address to memory 17. Once the most significant bits have been provided, several locations having addresses with the same ten most significant bits can be accessed by supplying only the ten least significant bits for each such location to the memory 17, because the memory already has the most significant bits. This is called a "page hit" situation.

When an address for the memory 17 has most significant bits which are different from the most significant bits of the address used in the immediately preceding memory access, then both the most significant bits and the least significant bits must be successively supplied to memory 17, which takes a little longer. This is called a "row miss" situation. A variation of this situation occurs when the internal timing of the memory is such that a short delay must elapse before it will accept both the most significant bits and least significant bits of the new address, and this is referred to as a "page miss" situation.

Thus, when a given location in the memory 17 is to be accessed, the amount of time required to access that location may vary on the basis of factors such as the relationship of the address for that location to the address of another location involved in an immediately preceding access. This must be taken into account in generating the -RDY or -BRDY signals to the CPU 13 on lines 56 or 57. In this regard, the memory controller 18 accepts the full 20-bit address, and in the case of the memory 17 determines whether it is dealing with a page hit, row miss or page miss situation, and then produces appropriate control signals at 21. 30 Alternatively, the memory controller 18 may determine from the full 20-bit address that the access is to a memory or device different than the memory 17, for which it is not possible to predict in advance the amount of delay which will be required. For example, the address may relate to a device which must be accessed across the extended industry standard architecture (EISA) bus 20, and the bus 20 may be temporarily under the control of a device other than the CPU 13, as a result of which the CPU 13 must be made to wait an indeterminate period of time until the other device relinquishes control of the bus. In situations of this type, where the duration of the access cannot be predicted in advance, the non-deterministic state machine circuit 36 is enabled, and will eventually produce the ARDY signal on line 37 or the ABRDY signal on line 38, which through NOR gate 41 or NOR gate 43 would generate the respective signal -RDY or -BRDY on line 56 or line 57 to the CPU 13. As mentioned above, the non-deterministic state machine circuit is conventional and is not the focus of the present invention, it is therefore not described in further detail.

In contrast, in situations where the memory controller 18 can predict in advance the delay which will be required to complete a particular access, the flexible deterministic state machine circuit 46 is enabled and will eventually produce the signal FRDY or the signal FBRDY on line 51 or line 52, which through gate 41 or 42 will produce the requisite signal -RDY or -BRDY on line 56 or 57 to the CPU 13.

Summarizing, for a given memory access, the memory controller 18 enables either the non-deterministic state machine circuit 36 or the flexible deterministic state machine circuit 46, but not both. The selected state machine circuit 36 or 46 which is enabled will then produce through gate 41 or 42 the signal -RDY or the signal -BRDY, as necessary for the particular cycle.

As mentioned above, a focus of the present invention is the flexible deterministic state machine circuit 46 utilized when the memory controller 18 can predict in advance the length of time required to complete the access, and the circuit 46 is described in detail later. In certain situations, a higher-speed version of the 486 CPU 13 (such as the 33 MHz version) may need to wait for a particular access, whereas a slower-speed version of the 486 CPU (such as the 25 MHz version) may be sufficiently slow so that it does not need to wait for that same access (or does not need to wait as long). An important feature of the state machine circuit 46 is that it is not restricted to a processor of any particular speed, but can be programmed to operate properly with any of the different speed versions of the processor 13.

A further consideration in this regard is the interleave factor of the memory 17, which may be a one-way interleave, two-way interleave or four-way interleave. In a one-way interleave version of the memory 17, there is a single memory bank containing all addresses, and data for four successive addresses must thus all be read successively from the single bank. In a two-way interleave version of memory 17, there are two banks and successive addresses alternate between the banks, so that two adjacent addresses can be accessed simultaneously. A four-way interleave version of the memory 17 includes four separate banks, so that a group of four successive addresses may be accessed simultaneously. Obviously, a version of the memory 17 with four-way interleave is faster than a version with two-way interleave, which in turn is faster than a version with one-way interleave.

A further consideration relates to the cache memory 16 in the CPU 13, which is updated when the CPU 13 writes a word to the memory 17, but which is not updated when another device writes a word to the memory 17. Consequently, whenever a device other than the CPU 13 writes a word to the memory 17, it is a requirement that a "snoop" cycle be performed. More specifically, when another device writes to the memory 17, the memory controller 18 asks the CPU for an opportunity to "snoop" in the cache 16 in order to determine whether the cache contains a duplicate of the location in the memory 17 which was changed. If it does, then that particular location is the cache 16 is invalidated so that, the next time the CPU 13 attempts to read information from that location, it will receive the updated information from memory 17 rather than the obsolete information from cache 16. The manner in which the CPU 13 and memory controller 18 cooperate for purposes of the snoop is conventional and therefore not described in further detail.

Some of the control signals which the CPU 13 can produce on the bus 14 include: an address strobe signal -ADS which indicates that the CPU is outputting a valid address on the bus 14; a -LOCK signal which is used by the CPU to temporarily prevent other devices from taking control of bus 14; and a -BLAST signal which is issued by the CPU to identify the last word in a burst transfer of the type discussed above.

Some of the control signals produced at 21 by the memory controller 18 include: a signal -HBURST which indicates that a current access can be part of a burst-type access; a signal HMREQ which the memory controller 18 asserts to obtain control of the memory 17; a signal HS which is asserted when the CPU is controlling bus 14 and which is deasserted when any other device is controlling bus 14; a signal SNUPRQ which the memory controller 18 asserts to initiate a snoop cycle; a signal -PAGEHIT which the memory controller asserts to identify a page hit situation of the type discussed above; a signal B1HARDY which the memory controller 18 uses to select one of the state machines circuits 36 and 46, depending on whether the required CPU delay can be predicted by the memory controller in advance; two signals IF0 and IF1 which indicate the interleave factor for the memory portion currently being accessed; and three signals CYCLN0, CYCLN1 and CYCLN2 which define a three-bit binary count value representing the number of CPU wait states to add to any write cycle or the first cycle of a read burst transfer. The two interleave signals IF0 and IF1 are set to 00 for a four-way interleave, 01 for a two-way interleave, 10 for a one-way interleave, and 11 for an access across a system bus (such as an ISA or EISA bus).

Figure 2A:
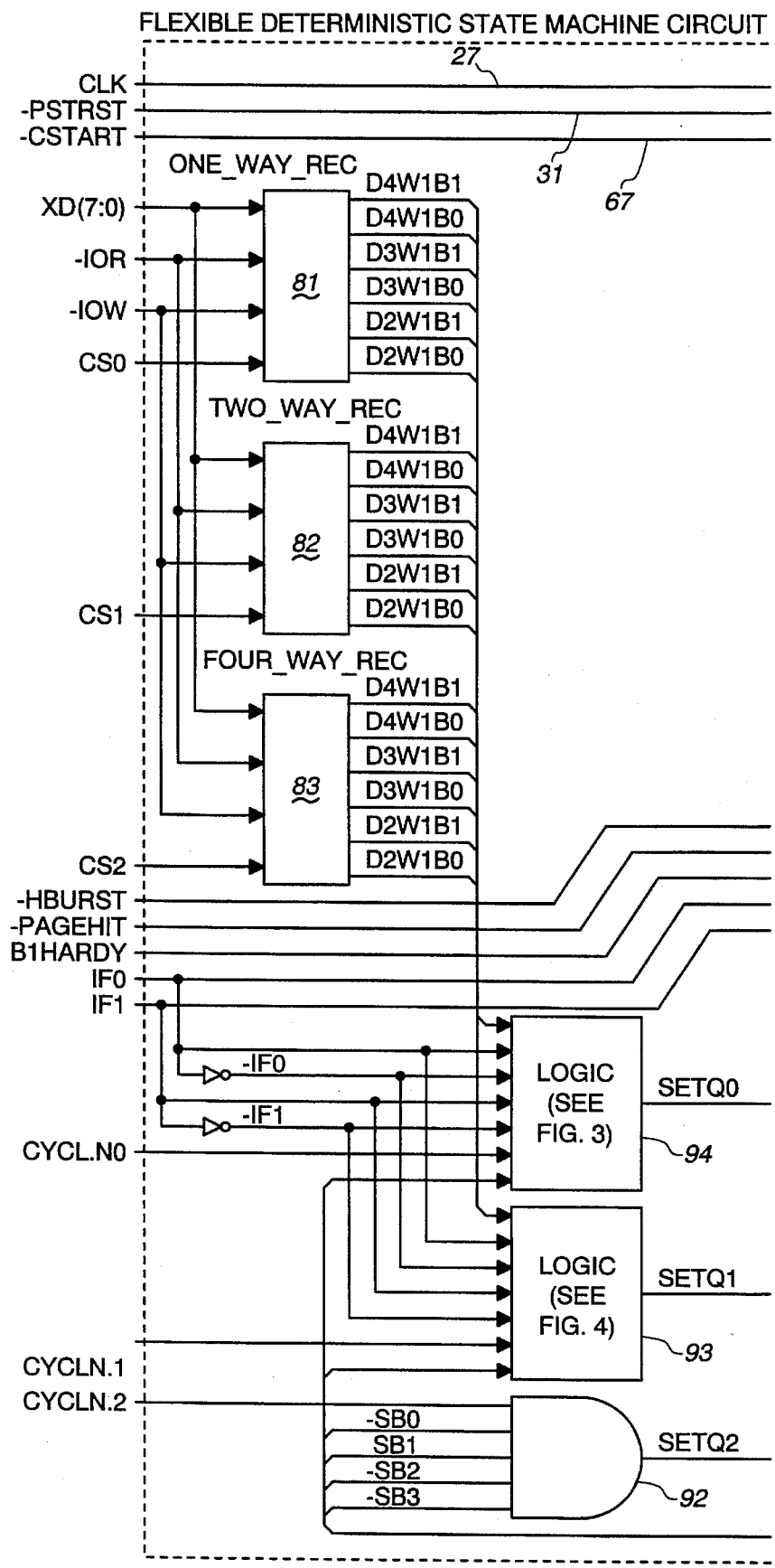
FIG. 2 is a block diagram of a deterministic state machine circuit which is a component of the system of FIG. 1.
Figure 2B:
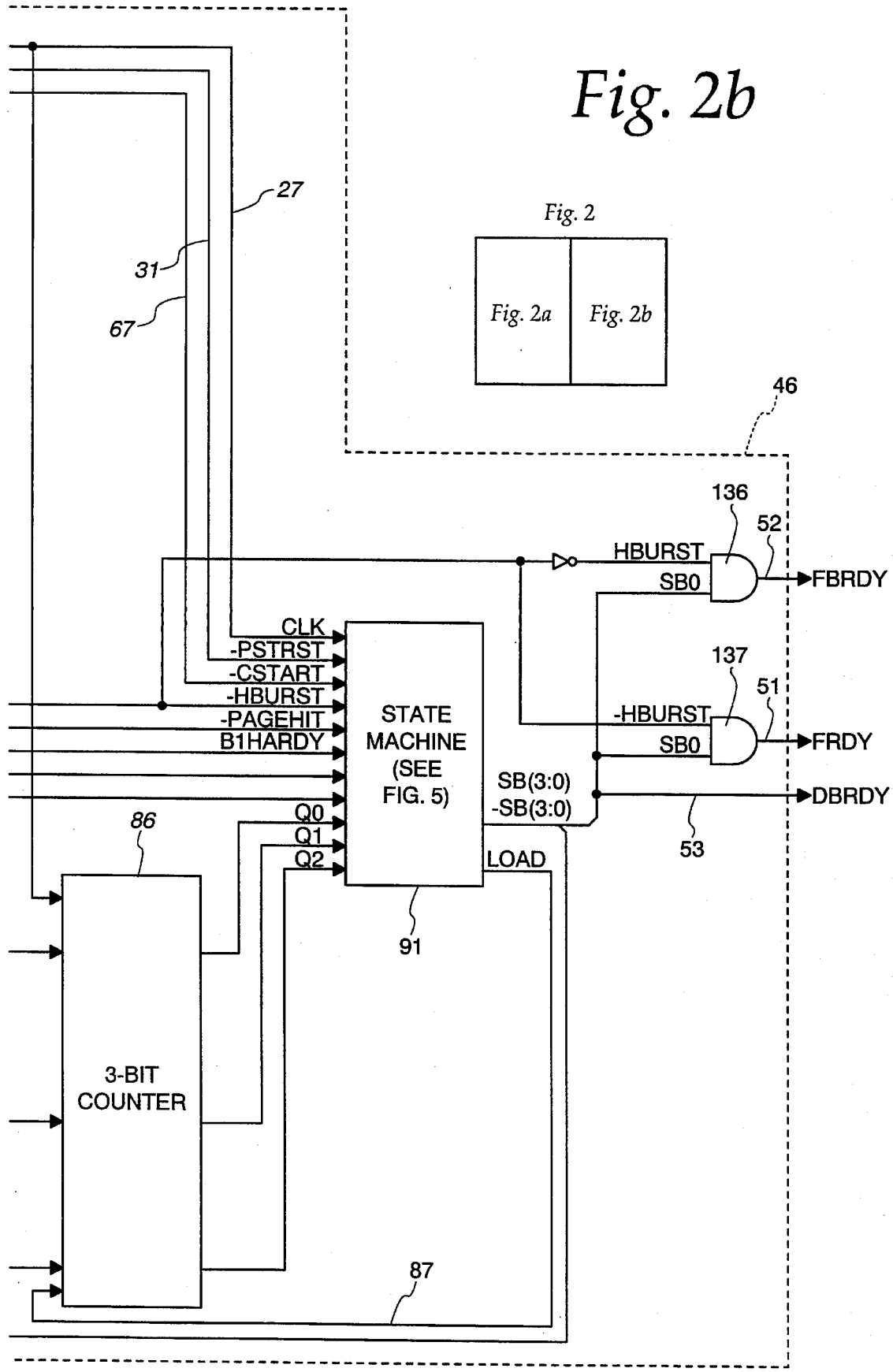

Turning now in more detail to the flexible deterministic state machine circuit 46 of FIG. 1, a schematic block diagram is shown in FIG. 2. The input signals to the state machine circuit 46 are shown along the left side of FIG. 2, and include the signal CLK from circuit 26 of FIG. 1, the reset signal -PSTRST from inverter 29, the signal -CSTART from the circuit 61, data lines XD7-XD0 from X bus 24 (FIG. 1), control signals -IOR and -IOW from EISA bus 20, chip select signals CS0, CS1 and CS2 from address decode circuit 47, and the signals -HBURST, -PAGEHIT, B1HARDY, IF0, IF1, CYCLN0, CYCLN1 and CYCLN2 from the memory controller 18.

The state machine circuit 46 of FIG. 2 includes three 8-bit registers 81–83, although only 6 bits of each register are actually used. The registers 81–83 are an important part of the present invention. When the computer system is first turned on, the CPU 10 determines its type and its maximum speed, then selects three predetermined bytes which correspond to that particular type and speed, and then loads each of the bytes into a respective one of the registers 81–83. In particular, the data present on lines XD7–XD0 of the bus 24 is loaded into the particular register when that register receives the signal -IOW while its respective chip select signal CS0, CS1 or CS2 is enabled. The tables in FIGS. 8–10 show the specific data values which can be loaded into the registers in the preferred embodiment, as well as the reset state of each register. Once the registers 81–83 have been loaded during the initialization process, they are not changed during normal operation. When one of the registers 81–83 10 receives the signal -IOR while its respective chip select signal CS0, CS1 or CS2 is enabled, that register outputs onto the lines XD7–XD0 an image of the data stored therein.

The information in the registers 81–83 basically represents partial count values identifying the necessary wait states for the second through fourth words of a read burst transfer, depending on the interleave factor of the memory section being accessed. More specifically, register 81 contains partial count values for a memory portion having a one-way interleave factor, where bits D2W1B1 and D2W1B0 are two bits of a 3-bit binary count value for the second word of a burst transfer, bits D3W1B1 and D3W1B0 are two bits of a 3-bit binary count value for the third word of the burst transfer, and bits D4W1B1 and D4W1B0 are two bits of a 3-bit binary count for the fourth word of the burst transfer. Similarly, register 82 contains partial count values similar to those in register 81 but for a memory portion having a two-way interleave factor, and register 83 contains partial count values similar to those in register 81 but for a memory portion having a four-way interleave factor.

In FIG. 2, reference numeral 86 identifies a three-bit counter of a conventional type, which is loaded with a preset in response to assertion of a LOAD signal on line 87, and which then counts down to zero in response to successive pulses of the clock signal CLK on line 27. The counter 86 has three outputs Q2, Q1 and Q0 which are connected to inputs of a state machine 91, where output Q0 is the least significant bit and output Q2 is the most significant bit of the counter. The three-bit preset value to be loaded into the counter 86 is defined by three signals SETQ2, SETQ1 and SETQ0, where SETQ0 is the least significant bit and SETQ2 is the most significant bit. A five-input AND gate outputs the signal SETQ2, a logic circuit 93 outputs the signal SETQ1 and a logic circuit 94 outputs the signal SETQ0. A state machine 91 outputs four state signals SB3, SB2, SB1 and SB0, and also outputs their logical complements -SB3, -SB2, -SB1 and -SB0. Four of these signals are coupled to respective inputs of the AND gate 92, the remaining input of which is coupled to the signal CYCLN2 from the memory controller 18. These state signals are also coupled to each of the logic circuits 93 and 94, and the logic circuits 93 and 94 also receive the outputs of the registers 81–83, both polarities of the interleave factor signals IF0 and IF1, and the respective signals CYCLN1 and CYCLN0 from the memory controller 18.

Figure 3:
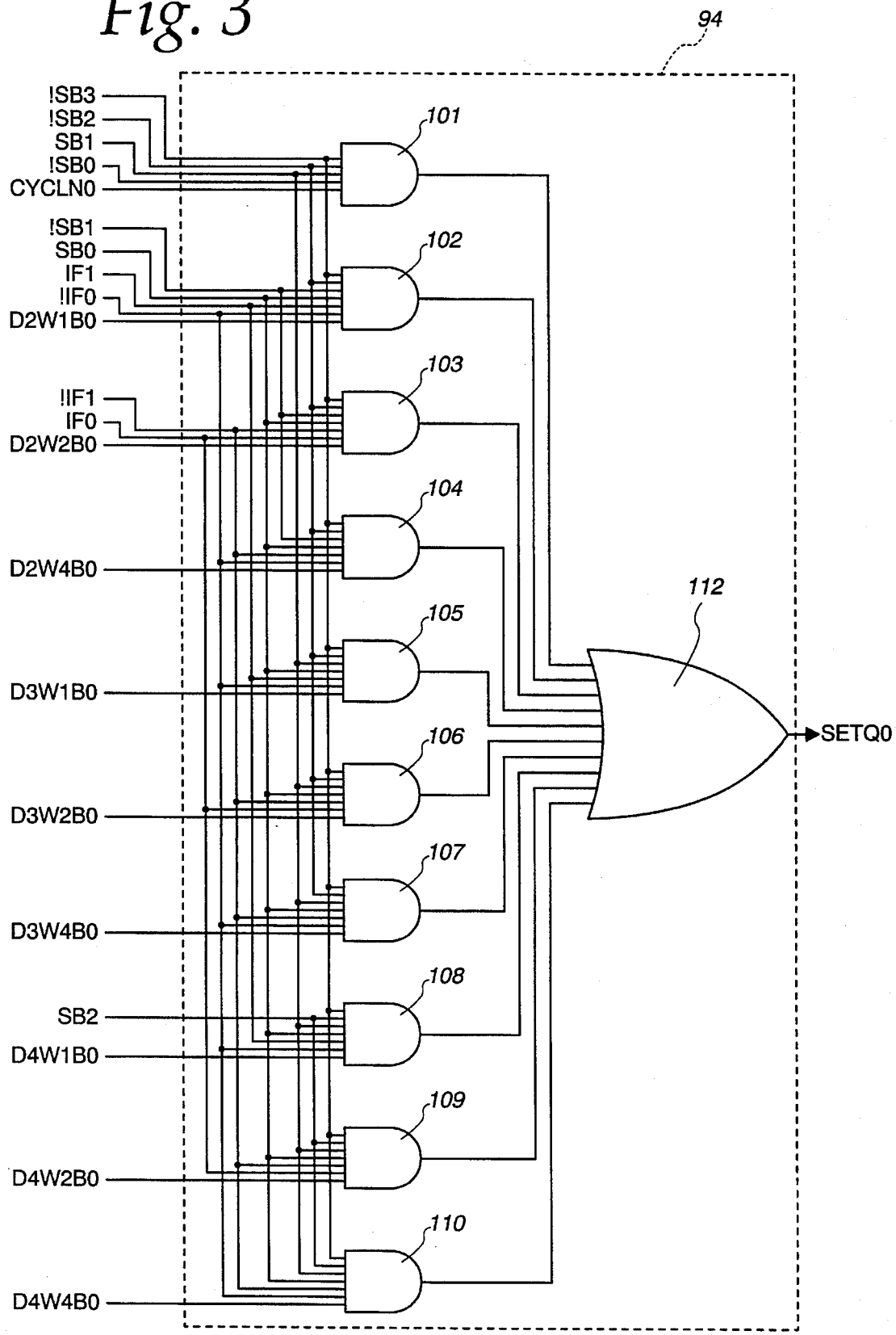
FIGS. 3 and 4 are schematic diagrams of respective similar logic circuits which are part of the deterministic state machine circuit of FIG. 2.

The logic circuit 94 is shown in more detail in FIG. 3, and includes ten multiple-input AND gates 101–110 which each have an output connected to a respective input of a 10-input OR gate 112, the output of the OR gate 112 being the signal SETQ0. Only one of the AND gates 101–110 is enabled at any given point in time. In particular, the gate 101 is enabled for the first cycle of any access, and gates the signal CYCLN0 to and through gate 112 and onto line SETQ0. The remaining gates 102–110 are utilized only in the case of a read burst transfer. In particular, one of the gates 102–104 is enabled for the second word of the transfer, one of the gates 105–107 is enabled for the third word, and one of the gates 108–110 is enabled for the four word. More specifically, gates 102, 105 and 108 are successively enabled if the burst transfer is accessing a section of memory with a one-way interleave factor, gates 103, 106 and 109 are successively enabled if the burst transfer is accessing a section of memory with a two-way interleave factor, and gates 104, 107 and 110 are successively enabled if the burst transfer is accessing a section of memory with a four-way interleave factor. Thus, each of the gates 102–110 supplies to the OR gate 112 and thus to the line SETQ0 a respective bit from one of the registers 81–83 (FIG. 2), which bit is the least significant bit of a 3-bit count preset.

Figure 4:
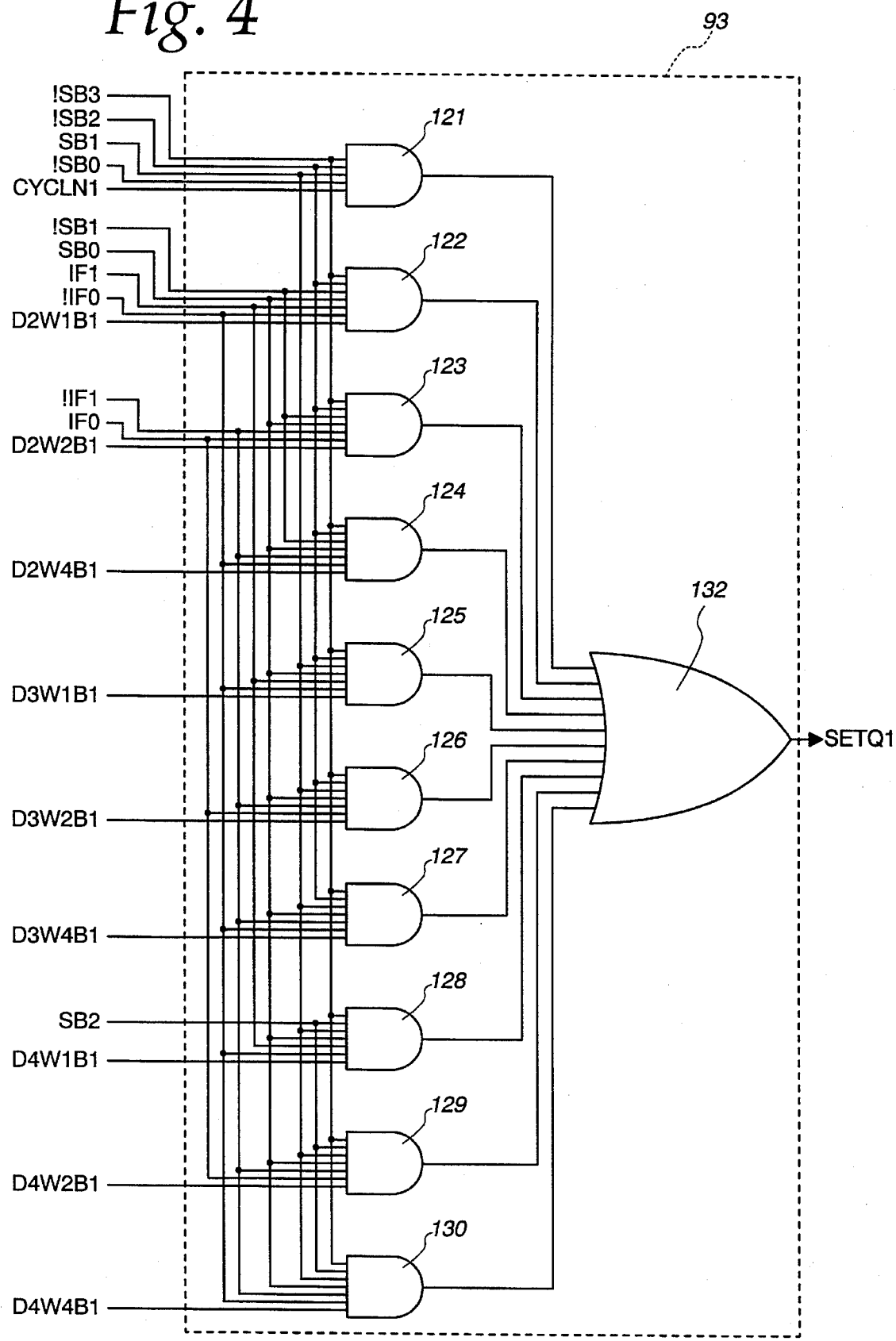

The logic circuit 93 of FIG. 2 is shown in more detail in FIG. 4, and is similar to the logic circuit 94. It includes ten AND gates 121–130, with outputs coupled to an OR gate 132, the output of the OR gate being the signal SETQ1. The gates 121–130 are respectively enabled when the gates 101–110 are respectively enabled. Gate 121 routes the signal CYCLN1 through gate 132 to serve as signal SETQ1, and gates 122–130 each route a respective bit from one of the registers 81–83 through gates 132 to serve as the signal SETQ1.

Thus, referring to FIG. 2, for the first word of any access, the signals CYCLN0, CYCLN1 and CYCLN2 are gated through circuits 92–94 to lines SETQ0, SETQ1 and SETQ2, so that the counter 86 is preset with a count value defined directly by memory controller 18. Then, if the access is a burst transfer, the gate 92 will remain disabled for the second through fourth words so that the most significant bit SETQ2 of the count preset is always zero, whereas respective pairs of bits from one of the registers 81–83 (as determined by the interleave factor) are selected by circuits 93 and 94 for successive words of the burst transfer to serve as the two least significant bits SETQ1 and SETQ0 of the count preset.

The signal SB0 corresponding to the least significant state bit is coupled to an input of each of two AND gates 136 and 137. The other input of gate 137 is coupled to the signal -HBURST from the memory controller, and the other input of gate 136 is coupled to the inverse signal HBURST, so that only one of the gates 136 and 137 is enabled at any given point in time. Gate 136 is enabled for burst transfers, and gate 137 is enabled for other transfers. The output of gate 137 is the signal FRDY on line 51, and the output of gate 136 is the signal FBRDY on line 52.

Figure 5:
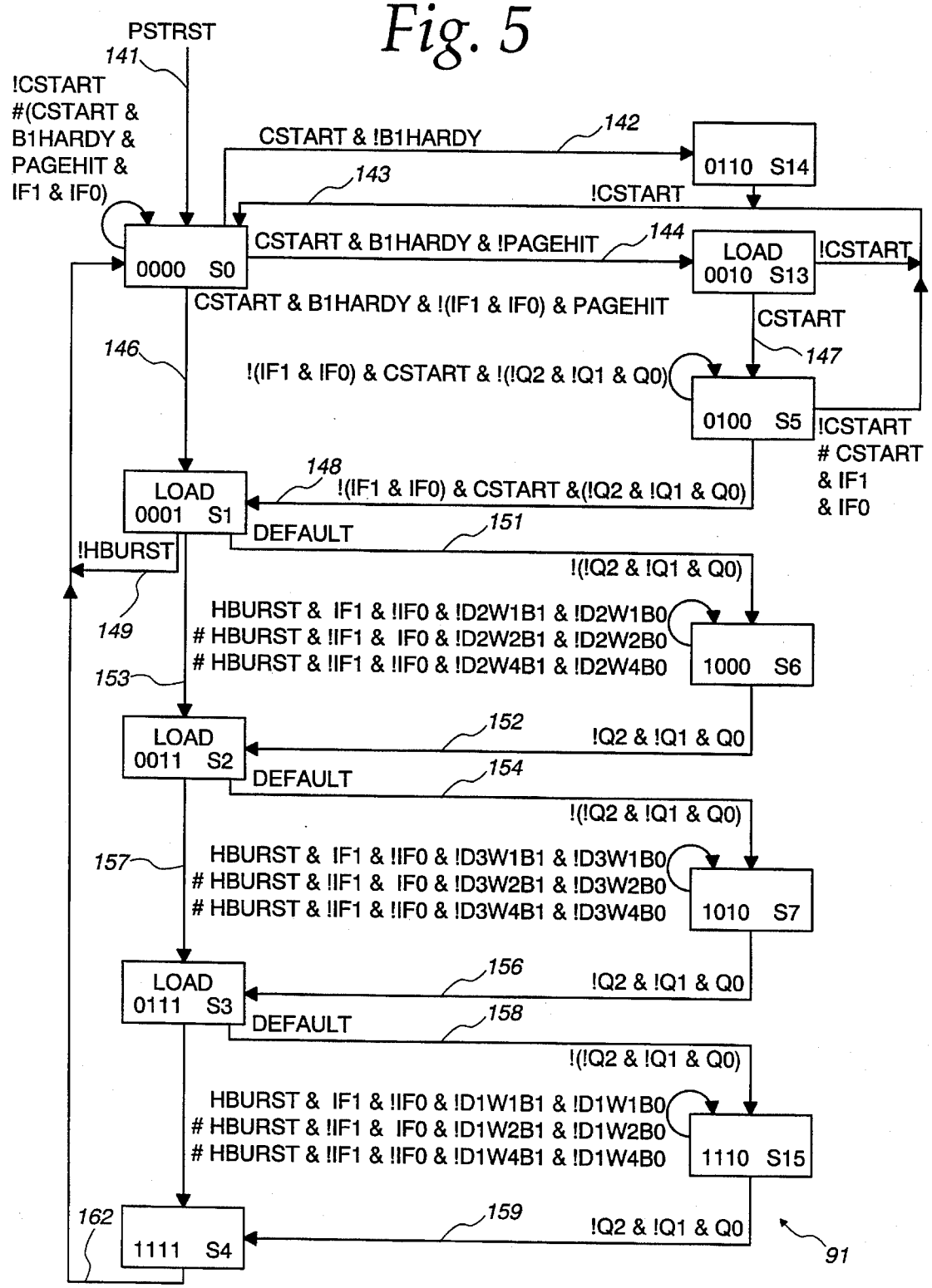
FIG. 5 is a state diagram for a state machine which is a component of the state machine circuit shown in FIG. 2.

Turning now to the state machine 91, the internal operation of the state machine is depicted in FIG. 5 in the form of a state diagram. Those of ordinary skill in the art are thoroughly familiar with state machines and the conventional techniques by which a state circuit can be directly designed from a state diagram such as that shown in FIG. 5, for example as disclosed in the book "Switching and Finite Automata Theory" by Zvi Kohavi, 1970, McGraw-Hill Book Company, New York. Accordingly, the state diagram of FIG. 5 is shown and described in detail, but the underlying circuitry is not.

In the lower left corner of each block in the state diagram of FIG. 5, a four-bit binary number is presented. This number represents the values of the four state bits in that state, the four bits respectively corresponding (left to right) to state signals SB3, SB2, SB1 and SB0. In the lower right corner of each block is an alphanumeric label identifying the particular state, for example "S13" for state 13. It will be noted that, in this state machine, the state numbers do not correspond directly to the binary values of the state bits. Thus, for example, in state 13 the state bits have a binary value of 2 rather than a binary value of 13. As mentioned above, the least significant state bit SB0 is supplied to gates 136 and 137 to generate the ready signal FRDY or FBRDY, and is also output on line 53 as the signal DBRDY. In FIG. 5, it will be noted that the least significant state bit SB0 is a binary "0" except in states 1, 2, 3 and 4, so that a ready signal is generated only during states 1, 2, 3 and 4. State 1 corresponds to the ready signal for the first word of any access, and states 2, 3 and 4 are used in the case of a burst transfer to generate ready signals for the second, third and fourth words of the transfer. It will also be noted that the word "LOAD" appears in the middle of the blocks for states 13, 1, 2 and 3. This indicates that the output signal LOAD from the state machine is asserted in each of these states in order to cause a load of the 3-bit counter 86 (FIG. 2) with a preset from lines SETQ2, SETQ1, and SETQ0.

In FIG. 5, a system reset forces the state machine to state 0 at 141. Thereafter, so long as the signal -CSTART (67 in FIG. 1) remains inactive, the state machine remains in state 0. (In FIG. 5, the terms !CSTART and CSTART respectively have a logic high state when the signal -CSTART is respectively inactive and active). In a situation where an access is started which will be handled by the non-deterministic state machine circuit 36 of FIG. 1 rather than the state machine circuit 46 (as indicated by the state of the signal B1HARDY), the state machine circuit 46 responds to activation of -CSTART by simply transitioning at 142 to state 14, where it does nothing except wait until the end of the cycle controlled by the state machine circuit 36, and then returns at 143 to state 0.

In the case of initiation of an access which is to be handled by the flexible deterministic state machine circuit 46 of FIGS. 1 and 2, the state machine 91 of FIG. 5 responds to B1HARDY by exiting state 0 at either 144 or 146. In particular, in the absence of a page hit condition, the state machine transitions from state 0 to state 13 at 144 in the absence of a page hit condition, and at state 13 the LOAD signal is asserted in order to load the counter 86 (FIG. 2) with a three-bit count value derived from the signals CYCLN2, CYCLN1 and CYCLN0. Thereafter, the state machine transitions at 147 to state 5, where it remains until the counter reaches the value of 1, and then it transitions at 148 to state 1 as the counter transitions to 0.

In the case of a page hit condition, the state machine would have transitioned directly from state 0 to state 1 at 146. In state 1, the least significant state bit SB0 is asserted to produce an appropriate ready signal through one of the gates 136 and 137 (FIG. 2) to the CPU. In addition, the LOAD signal is asserted in order to load the three-bit counter 86 with an appropriate count value from the registers 81–83 for the second word of a burst transfer. If the CPU is not operating in a burst mode, then control proceeds at 149 from state 1 back to state 0, and the counter is ignored.

Otherwise, if at least one of the bits being loaded into the counter 86 is a logic 1, the state machine transitions at 151 to state 6, where it waits while the counter counts to a value of one, and then transitions at 152 to state 2 as the counter transitions to 0. On the other hand, if the count value located into counter 86 was 0, the state machine would have transitioned directly from state 1 to state 2 at 153.

In state 2, the least significant state bit SB0 is again asserted to generate the ready signal for the second word of the burst transfer, while the LOAD signal is asserted again to load the counter 86 with a count value for the third word of the burst transfer. If the counter is being loaded with a non-zero count value, the state machine then transitions at 154 to state 7, where it waits until the counter has a value of 1 and then transitions at 156 to state 3 as the counter transitions to a value of 0. Alternatively, if the count value loaded into the counter at state 2 is zero, the state machine transitions directly from state 2 to state 3 at 157.

In state 3, the least significant state bit SB0 is again asserted to produce an appropriate ready signal for the third word of the transfer, while the LOAD signal is again asserted to load the counter 86 with a count value for the fourth word of the transfer. If the counter is loaded with a non-zero value, the state machine transitions from state 3 to state 15 at 158, waits in state 15 until the counter has a value of 1, and then transitions at 159 to state 4 as the counter transitions to 0. Alternatively, if a count value of zero is loaded in state 3, the state machine transitions directly from state 3 to state 4 at 161.

In state 4, the least significant state bit SB0 is again asserted to produce an appropriate ready signal to the CPU for the last word of the burst transfer. The state machine then transitions unconditionally at 162 from state 4 to state 0.

Turning briefly to the CSTART generation circuit 61, the circuit 61 is not in and of itself the focus of the present invention. Roughly speaking, the CSTART generation circuit 61 asserts the signal -CSTART at the start of an access, and keeps it asserted until the last ready signal RDY or BRDY has been generated through one of the gates 41 and 42. Those of ordinary skill in the art are capable of designing an appropriate CSTART generation circuit 61. Nevertheless, for purposes of completeness, FIGS. 6 and 7 set forth Boolean equations representing a logic circuit which will implement appropriate timing for the CSTART signal. To facilitate an understanding of the present invention, the circuit represented by the equations in FIGS. 6 and 7 generates CSTART only for processors having maximum speeds of 25 MHz or 33 MHz, but it will be recognized that this circuit could be easily modified to accommodate other processor types and speeds. The deterministic state machine Circuit 46 shown in FIGS. 2–5 is compatible with the other processor types and speeds without any change thereto. Further discussion of the CSTART generation circuit 61 is believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A computer system, comprising: a memory; a processor coupled to said memory, said processor including access control means for effecting an access to said memory and for delaying completion of said access to said memory in the absence of and until an occurrence of a control signal; and a deterministic circuit coupled to said processor and said memory and having register means containing control information loaded by said processor, said deterministic circuit having signal generation means for generating said control signal, said signal generation means including delay means for selectively delaying generation of said control signal during an access to said memory by a time interval having a duration which is function of the control information in said register means.

2. A computer system according to claim 1, including initialization program means for causing said processor to identify a characteristic of said processor, to select one of a plurality of information units which correspond to respective variations of said characteristic, and to load into said register means as said control information the selected information unit.

3. A computer system according to claim 2, wherein said processor is one of a plurality of processor types, and wherein said characteristic reflects said processor type of said processor.

4. A computer system according to claim 2, wherein said processor is one of a plurality of processor types and operates at one of a plurality of processor speeds, and wherein said characteristic reflects the processor type and speed of said processor.

5. A computer system according to claim 2, wherein said processor operates at one of a plurality of processor speeds, and wherein said characteristic reflects the processor speed of said processor.

6. A computer system according to claim 2, including connector means for releasably coupling said processor to said memory and said deterministic circuit.

7. A computer system according to claim 6, wherein said connector means includes a processor socket, said processor being an integrated circuit removably inserted in said socket.

8. An apparatus according to claim 2, wherein said delay means includes a counter, and includes means for loading into said counter a count value which is derived from said control information in said register means and which represents said time interval.

9. A computer system according to claim 2, wherein said access control means in said processor has means for effecting a burst access which includes a plurality of successive accesses to said memory, wherein said control information in said register means includes an information set having a plurality of information portions each corresponding to a respective said access of said burst access, and wherein said delay means is successively responsive to said information portions of said information set during respective and successive said accesses of said burst access.

10. A computer system according to claim 9, wherein said memory includes means for generating an interleave indication representing an interleave factor of a section of said memory which is being accessed, wherein said control information in said register means includes a further information set having a plurality of information portions which correspond to respective said accesses of said burst access, and wherein said delay means selects one of said information sets based on said interleave indication and is successively responsive to said information portions of said selected information set during respective and successive said accesses of said burst access.

11. A computer system according to claim 9, wherein said memory includes control means for indicating a duration for a first of said accesses of said burst access, said delay means being responsive to said control means of said memory during the first of said accesses of said burst access and being responsive to said information portions of said information set in said register means during successive said accesses of said burst access.

12. A computer system according to claim 9, wherein said selective delay means includes a counter, and includes means for loading into said counter a count value which is derived from said control information in said register means and which represents said time interval.

* * * * *